United States Patent Office 2,715,650
Patented Aug. 16, 1955

2,715,650

RUBBER TREATMENT

Kenneth W. Doak, Bloomfield, N. J., assignor to United States Rubber Company, New York, N. Y., a corporation of New Jersey No Drawing. Application January 12, 1954,
Serial No. 403,658

4 Claims. (Cl. 260—763)

This invention relates to improvements in the technique of processing high carbon black and rubber mixes prior to vulcanization thereof, and more particularly to improvements in so-called "low-hysteresis" processing of carbon black and rubber mixes.

The technique of processing high carbon black and rubber mixes prior to vulcanization thereof, whereby to obtain vulcanizates with improvements in physical and chemical properties, is described in Gerke et al. U. S. P. 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

These improved vulcanizates are obtained, in accordance with the Gerke et al. technique, by incorporating in the rubber a relatively large amount of carbon black, for example, at least 25 parts, and preferably in the case of tire treads at least 40 parts by weight of carbon black per 100 parts by weight of rubber, and then subjecting a substantially homogeneous mixture of the ingredients to a heat treatment at a temperature substantially above 250° F., the preferred temperature being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes duration will be found suitable for most purposes, and particularly within the preferred temperature range.

An object of the present invention is to provide new chemical promoters for the processing of rubber and carbon black mixes as described in U. S. P. 2,118,601 whereby to obtain high electrical resistance and low torsional hysteresis of tread stocks. A further object is to provide substantial decreases in the time of the low-hysteresis processing by the use of the herein disclosed chemicals with consequent increase in the capacity and output of equipment. Other objects will appear more fully hereinafter.

I have found that nitrites of alkali and alkaline-earth metals substantially decrease the time and/or lower the temperature required for low-hysteresis processing of mixtures of rubber and carbon black. They are effective in natural rubber (i. e., Hevea rubber), synthetic rubbery homopolymers of aliphatic conjugated diolefin hydrocarbons, especially butadiene and isoprene, and synthetic rubbery copolymers of such diolefin hydrocarbons with copolymerizable monoolefinic compounds, such as styrene, alpha-methyl styrene, methyl acrylate, ethyl acrylate, methyl methacrylate, acrylonitrile, methyl vinyl ketone, methyl isopropenyl ketone, and monovinylpyridines, which copolymers contain at least 25% of combined diolefin. The alkali and alkaline-earth nitrites are particularly effective in natural rubber and in rubbery copolymers of butadiene and styrene (known as "GR-S"). They are of course effective in compatible mixtures of the aforementioned rubbery materials, for example, in blends of natural rubber with rubbery copolymers of butadiene and styrene.

In practicing my invention, I prefer to use the commoner alkali metal nitrites, such as those of sodium and potassium.

The process of my invention comprises mixing the rubber with a relatively large amount of a rubber-reinforcing carbon black and a relatively small but effective amount, viz., from 0.5 to 3 parts, per 100 parts of rubbery material, of an alkali or alkaline-earth nitrite, and heating this mixture at a temperature of from 275° F. to a temperature just short of that at which the rubber would be injured, e. g., heating it at 275–400° F., and masticating the mixture during or following the heat treatment. This process brings about the desired changes in the rubber and carbon black mixture whereby a vulcanizate of this mixture will have a considerably reduced torsional hysteresis and a considerably increased electrical resistivity. This heat treatment is carried out in the absence of vulcanizing materials, e. g., sulfur or sulfur-yielding compounds. Following the heat treatment, the vulcanizing and other desired compounding ingredients including conventional accelerators, if necessary or desired, and the like are intimately incorporated in the conventional manner, after which the mixture is shaped and vulcanized in the usual way.

If desired, softeners, e. g., hydrocarbons commonly used as rubber softeners, and/or fatty acid, especially stearic acid, can be present during the heat treatment. If stearic acid is present in sufficient amount, its later addition is unnecessary.

Any carbon black which is capable of reinforcing the rubber can be used in the practice of my invention. I usually use either a furnace black or a channel black. Those skilled in the art will appreciate that the type of black is often selected with reference to the particular rubber employed. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can be as great as 100 parts per 100 parts of rubber.

In the preferred practice of my invention, the heat treatment of the mixture of rubber, carbon black and the nitrite is carried out by mastication at temperatures in the range 275–400° F., and more preferably in the range 300–400° F., with any suitable type of masticating equipment such as an open two-roll rubber mill or, more preferably, an internal rubber mixer, especially a Banbury mixer. The Banbury mixer is particularly advantageous because it exerts a severe masticatory action upon the charge and because it conserves the heat generated by the mixing action and this heat greatly aids in elevation of the stock temperature to within the desired range. Depending upon the size and operating speed of the Banbury mixer, and other factors, extraneous heat may or may not need to be applied to bring the stock temperature within the desired temperature range and to hold it there. If desired, extraneous cooling may be applied to keep the temperature from rising above the desired level.

The optimum duration of the heat treatment will vary depending upon many factors, including the temperature of heat treatment, type of heat treatment, i. e., whether it is static or dynamic, type of equipment used, e. g., in the case of masticatory heat treatment whether an open rubber mill or a Banbury or other type of internal mixer is used, the amount of nitrite used, etc. In any event, the treating time will be considerably shorter, at given temperature conditions, than the time required when the nitrite is omitted. In the case of the preferred masticatory treatment, times of the order of 5 to 30 minutes will generally be adequate for the purposes of my invention, the longer times being used at the lower temperatures and vice versa. It is well-known that different rubbers vary as to the highest temperatures they can withstand without harm and the time and temperature should of course be so regulated as to not impair the properties of the final vulcanizate.

It is preferable to form an intimate mixture of the rubber, carbon black and the nitrite at a relatively low temperature, i. e., below 275° F., in order to avoid premature reaction of the nitrite whereby its promoting effect upon the low-hysteresis processing would be reduced. In the case of the alkali metal nitrites, I often prefer to dissolve them in water to form a solution which can be added conveniently to the stock undergoing mixing on the mill or in the Banbury mixer. Preferably only enough water to dissolve the nitrite is employed in order to minimize the volume of material to be handled.

The following example illustrates the preferred methods of practicing the invention. All parts are by weight.

Example

A masterbatch is prepared by mixing together 100 parts of natural rubber, 50 parts of carbon black (a medium processing channel black known commercially as "Spheron-6"), and 5 parts of stearic acid. This mixing operation is carried out in the conventional manner in a Banbury mixer or on a two-roll rubber mill. To 155 parts of this masterbatch, 1.4 parts of sodium nitrite (dissolved in a small amount of water) is added on a two-roll rubber mill at a batch temperature of about 200° F. The mill temperature is then raised to 300° F., and the mixture is masticated for 10 minutes. Thereafter the mill is cooled to 150–200° F. and 2 parts of pine tar, 2 parts of zinc oxide, one part of antioxidant, 1 part of accelerator and 2.6 parts of sulfur are incorporated. The mixture is placed in a suitable mold and vulcanized 45 minutes at 287° F. As a control, an identical masterbatch is prepared and subjected to all the previously described manipulative steps except that no sodium nitrite is added to the mixture. The specific electrical resistivity and torsional hysteresis are measured, with the following results:

| Promoter | Log Resistivity | Tors. Hyst., 280° F. |
|---|---|---|
| None | 7.2 | 0.127 |
| Sodium nitrite | 12.4 | 0.082 |

The practice of the invention thus increases the specific electrical resistivity by a factor of over 100,000, and decreases the torsional hysteresis at 280° F. by 35%. Similar results are obtainable by the use of the nitrites of potassium, lithium, calcium, barium, caesium, and strontium.

Although I have disclosed my invention with particular emphasis upon the preferred practice wherein the heat treatment is accompanied with mastication, nevertheless my invention can be practiced by carrying out the heat treatment under static conditions. For example, I may intimately mix the rubber, carbon black and nitrite in any suitable manner and then heat this mixture at 275–400° F. without simultaneously masticating it, the heat-treated mixture being subsequently masticated and compounded with conventional compounding and vulcanizing ingredients followed by shaping and vulcanizing in the usual way. The static heat treatment can be conducted by placing slabs of the stock in an oven heated to a suitable temperature, or slabs of hot stock can be stacked up and allowed to stand for several hours, preferably under relatively non-heat-conductive conditions, in order to maintain the mixture at the temperature of 275–400° F. for as long as reasonably possible. If desired, the slabs can be wrapped with a suitable insulating blanket to cause prolonged retention of heat. Such static heat-treatment has the advantage of releasing the Banbury equipment from use for carrying out the heat teatment and this may be desirable under certain conditions.

The electrical resistivity values given in the above examples were determined by measuring the resistance of a specimen of known thickness (about 0.1 inch) placed between mercury electrodes, under a potential difference of 135 volts, using a sensitive galvanometer with an Ayrton shunt. The logarithm (to base 10) of the specific electrical resistivity (expressed in ohm-cms.) is designated "Log Resistivity."

The torsional hysteresis figures represent the logarithmic decrement (to base 10) of the observed amplitudes of successive oscillations of a torsion pendulum, measured at 280° F. with an apparatus consisting essentially of a torsion pendulum in which the sample of rubber tested supplies the restoring force when the pendulum is deflected. For further description of this test see Gerke et al., 2,118,601.

Having thus described my invention, what I claim and desire to protect by Letters Patent is:

1. A process which comprises mixing rubber selected from the group consisting of natural rubber, synthetic rubbery homopolymers of aliphatic conjugated diolefin hydrocarbons and synthetic rubbery copolymers of said diolefin hydrocarbons with copolymerizable monoolefinic compounds, which copolymers contain at least 25% of combined diolefin, with a relatively large amount of rubber-reinforcing carbon black, and nitrite of a metal selected from the alkali metals and the alkaline-earth metals in amount equal to from 0.5 to 3 parts per 100 parts of said rubber, heating the mixture at a temperature of at least 275° F. but below that at which the rubber would be harmed, masticating the mixture and completing incorporation of vulcanizing and other desired ingredients, shaping the mass, and vulcanizing the resulting shaped mass.

2. A process which comprises mixing rubber selected from the group consisting of natural rubber, synthetic rubbery homopolymers of aliphatic conjugated diolefin hydrocarbons and synthetic rubbery copolymers of said diolefin hydrocarbons with copolymerizable monoolefinic compounds, which copolymers contain at least 25% of combined diolefin, with a relatively large amount of rubber-reinforcing carbon black, and nitrite of a metal selected from the alkali metals and the alkaline-earth metals in amount equal to from 0.5 to 3 parts per 100 parts of said rubber, masticating the mixture at a temperature of from 275° to 400° F., thereafter incorporating vulcanizing and other desired ingredients, shaping the mass, and vulcanizing the resulting shaped mass.

3. A process which comprises mixing natural rubber with a relatively large amount of rubber-reinforcing carbon black, and nitrite of a metal selected from the alkali metals and the alkaline-earth metals in amount equal to from 0.5 to 3 parts per 100 parts of said rubber, masticating the mixture at a temperature of from 275° to 400° F., thereafter incorporating vulcanizing and other desired ingredients, shaping the mass, and vulcanizing the resulting shaped mass.

4. A process which comprises mixing natural rubber with a relatively large amount of rubber-reinforcing carbon black, and sodium nitrite in amount equal to from 0.5 to 3 parts per 100 parts of said copolymer, masticating the mixture at a temperature of from 275° to 400° F., thereafter incorporating vulcanizing and other desired ingredients, shaping the mass, and vulcanizing the resulting shaped mass.

No references cited.